United States Patent
DaCunha et al.

(10) Patent No.: US 6,840,701 B2
(45) Date of Patent: Jan. 11, 2005

(54) CLAMP FOR SECURING MECHANICAL DRIVE COMPONENTS TO A SHAFT

(75) Inventors: Steven J. DaCunha, West Hartford, CT (US); Jeffrey E Vill, New Milford, CT (US)

(73) Assignee: Pitney Bowes Inc., Stamford, CT (US)

(*) Notice: Subject to any disclaimer, the term of this patent is extended or adjusted under 35 U.S.C. 154(b) by 0 days.

(21) Appl. No.: 10/138,966

(22) Filed: May 2, 2002

(65) Prior Publication Data

US 2003/0206768 A1 Nov. 6, 2003

(51) Int. Cl.$^7$ ................................................ F16H 55/00
(52) U.S. Cl. ..................... 403/290; 403/344; 403/359.1
(58) Field of Search ................. 403/344, 290, 403/289, 359.1, 359.4, 359.5

(56) References Cited

U.S. PATENT DOCUMENTS

| | | | |
|---|---|---|---|
| 4,142,811 A | * | 3/1979 | Burnham .................... 403/290 |
| 5,052,842 A | | 10/1991 | Janatka ......................... 403/14 |
| 5,791,191 A | * | 8/1998 | Wittenstein et al. ......... 403/344 |
| 5,848,947 A | * | 12/1998 | Fornasiere et al. .......... 403/344 |
| 6,413,006 B1 | * | 7/2002 | Neugart ....................... 403/344 |
| 6,527,233 B2 | * | 3/2003 | Maurice ...................... 403/373 |

* cited by examiner

Primary Examiner—Frederick L. Lagman
(74) Attorney, Agent, or Firm—Christo pher J. Capelli; Angelo N. Chaclas

(57) ABSTRACT

A clamping device for securing a mechanical driven component to a drive shaft. The clamping device including a clamping member having a securing mechanism that fixedly secures the clamping member to the drive shaft. The clamping device further includes an elongate cylindrical hub member unitarily formed with the clamping member with the hub member having an outer circumference configured to secure to a mechanical driven component.

9 Claims, 3 Drawing Sheets

CLAMP FOR SECURING MECHANICAL DRIVE COMPONENTS TO A SHAFT

FIELD OF THE INVENTION

This invention relates to machines having rotating mechanical drive components and more particularly to an inserter having rotating shafts with drive components connecting to the rotating shafts.

BACKGROUND OF THE INVENTION

It is known to assemble mechanical drives comprising a drive (or driven) shaft and rotatable parts or components which are subjected to repeated fluctuations in load. For example, inserter machines, such as the 8300 Inserter Series manufactured by the assignee of the present invention, include bursting and sheet feeding apparatus which continually operate in rapid stop and go, or deceleration and acceleration movement of the mechanical drives. A basic problem inherent with such operation is that over a period of operation the mechanical drive components wear and become loose on the shaft causing the components to slip and the operation to malfunction.

Various methods have been used to prevent the mechanical drive components, such as pulleys, sprockets or gears, from slipping on the drive shaft. One method that is well known is to secure the component to the drive shaft using a set screw passing through the component or through an extended portion of the hub of the component. The set screw is tightened against the drive shaft to lock the component in place. Variations of this method include the use of a "D" shaft whereby the screw is tightened against the flat portion of the shaft. Typically, the "D" hole of the component is sized and matched to the "D" shape of the shaft such that it just slips over the shaft. Although such methods are suitable for securing the components to the drive shaft, experience has shown that they do not prevent the assembled component from becoming loose on the shaft and moving from the prescribed lateral position. The continuous fluctuations in load, such as the stop and go movement caused by clutch and brake operation in a bursting apparatus, eventually causes the screw to loosen or the shaft to wear and eventually causes a failure in the apparatus. Another problem with tightening the set screw against the drive shaft is that the screw notches the drive shaft and the notches may restrict further adjustments to the location of the component on the drive shaft.

A more reliable method of securing a drive component to the drive shaft is positioning the component, such as a pulley, laterally on the drive shaft during assembly, drilling a tapered hole through the pulley and its hub and the drive shaft, and banging a tapered pin into the hole so that the component becomes integral with the drive shaft. This provides an assembly capable of handling repeated fluctuations in load. One disadvantage with this method is that it is not suitable for use with nonmetal components on machines having torque loads such as inserters. Another disadvantage of this method is that although it is more reliable for preventing a loosing of the component on the drive shaft, it is not suitable for after assembly adjustment or replacement of the component. Because the hole is drilled through the component and shaft at the same time during assembly, it is difficult to replace a worn component without replacing the shaft. Furthermore, this method does not leave room for error because once the hole is drilled into the drive shaft mistakes in the lateral positioning of a component on the shaft cannot easily be corrected. Any position adjustments may require replacement of the drive shaft. Another problem in this area is that commercially manufactured drive components typically are manufactured with a round hole. When the component is to be used on a "D" shaft, a special part must be ordered or a hub with a "D" hole must be inserted into a bored out hole in the component. Generally, the hubs which are suitable for use with metal components are not suitable for use with softer material such as urethane.

One attempt to overcome the above-noted problems of mounting a mechanical drive component to a shaft can be found in commonly assigned U.S. Pat. No. 5,052,842 to Karel J. Janatka. Even though the invention of this patent was an improvement over the existing art at the time of the invention, it still suffers from some notable drawbacks when applied to modern high-speed inserter systems. For instance, this invention disclosed a two part clamping member consisting of a clamp collar and a separate hub member wherein the hub member receives into the clamp collar around a shaft extending therethrough. However, with this arrangement, it has been found that it is not adequate for high performance motion control demanded by modem high-speed inserter systems, such as the Pitney Bowes APS inserter system. This is because in such high speed inserter systems, typical accelerations and decelerations at the paper path routinely exceed 8 G-forces. And typical duty cycles for a complete start and stop motion profile are typically 5 cycles/second, and some may even be higher, such as, backstop motors that execute at 10 cycles/second. To accomplish these aggressive motions, mechanisms must be designed to minimize inertia and servo motors have to be selected that have coupling ratios that are calculated to minimize motor heating. It is noted that motor heating is usually the limiting factor for accomplishing continuous duty high-performance incremental motion profiles.

Thus, in such high-speed inserter systems that require aggressive incremental motion control, it is desirable to tightly couple driven mechanism loads to their respective driven shaft. However, traditional clamping methods, such as the clamping collar disclosed in U.S. Pat. No. 5,052,842, are not adequate for such high performance motion control since the clamp collar introduces significant inertia, thus increasing peak and RMS torque required of the motors driving the shafts. This ultimately increases motor heating and decreases the life expectancy of the motors. Further, the two part clamp assembly of this invention still requires the use of a D-shaped shaft.

It is also noted that in addition to what is described above, other methods of mounting drive components to hubs are known but require special assembling or tooling.

SUMMARY OF THE INVENTION

The present invention provides a clamping device for securing a mechanical component, such as a timing pulley to a drive shaft.

The clamping device is unitarily formed and includes a clamping member having separated first and second portions, each portion being configured to fixedly secure about a drive shaft. Connected to, and extending from each first and second portion of the clamping member is an elongate cylindrical hub member having an outer circumference configured to secure to the mechanical component, preferably via an interference fit.

A resilient collar member is disposed intermediate the clamping member and elongate hub member wherein one end of the collar member is connected to the first and second portions of the clamping member and an opposing end of the collar member is connected to an end portion of the elongate hub member. The resilient collar member enables the integrally formed first and second members of the clamping member to flex towards to a drive shaft so as to be secured thereto, via a locking mechanism.

BRIEF DESCRIPTION OF THE DRAWINGS

The above and other objects and advantages of the present invention will become more readily apparent upon consideration of the following detailed description, taken in conjunction with accompanying drawings, in which like reference characters refer to like parts throughout the drawings and in which.

DETAILED DESCRIPTION OF THE PREFERRED EMBODIMENT

Figure 1:
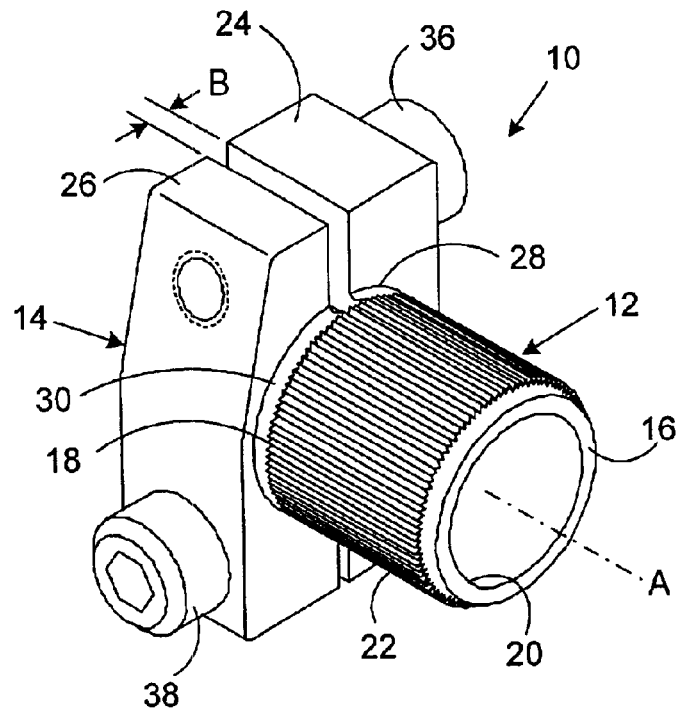
FIG. 1 is a isometric view of the present invention clamp assembly.
Figure 2:
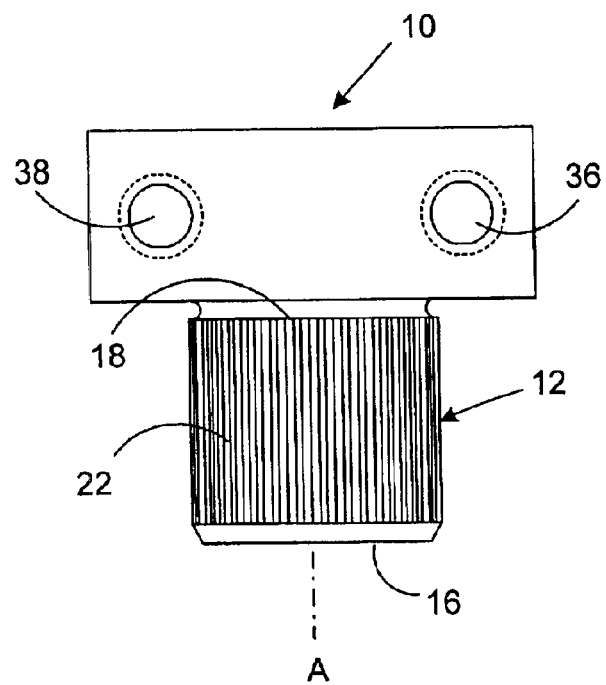
FIG. 2 is a top planar view of the clamp assembly of FIG. 1.
Figure 3:
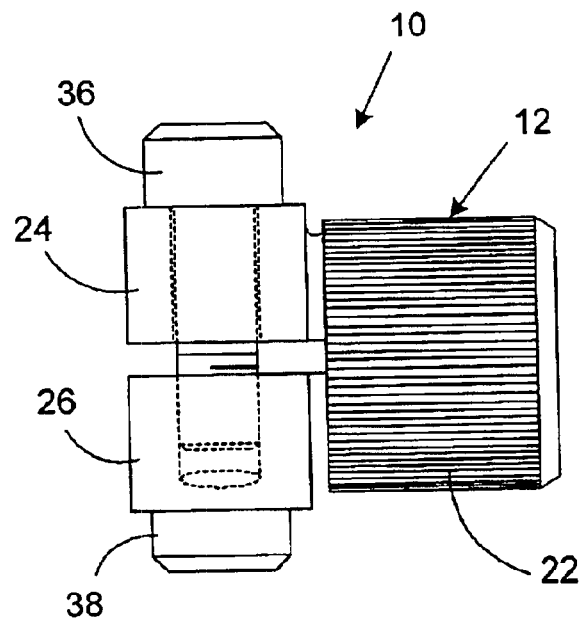
FIG. 3 is a side planar view of the clamp assembly of FIG. 1.

In describing the preferred embodiment of the present invention, reference is made to the drawings, wherein there is seen a clamping device, designated generally by reference numeral 10, which is preferably used to secure a mechanical drive component, such as a commercial timing pulley 100 to a drive shaft 200. Preferably, the unitarily constructed clamping device 10 is formed by compacting powdered metal under high pressure.

With reference now to FIGS. 1–4, clamping device 10 includes a cylindrical hub member 12 unitarily formed with a clamping member 14. As will be further discussed below, hub member 12 is configured to secure with a mechanical drive component (e.g., commercial timing pulley 100) and the clamping member 14 is configured to secure to a drive shaft 200 wherein rotation of the drive shaft 200 causes corresponding rotation of a pulley 100, via clamping device 10. It is to be appreciated that the clamping device 10 may be used to secure any suitably configured mechanical drive component to a shaft and for ease of description reference will be made only to a pulley 100 in this description.

The hub member 12 extends longitudinally from the clamping member 14 along axis "A" and includes opposing end portions 16 and 18. The hub member 12 is formed to have an inner bore portion 20 and a corresponding outer circumference 22, which outer circumference 22 is preferably provided with a knurled grooves for securing to pulley 100, as discussed further below. And the inner bore portion 20 of hub member 12 is dimensioned to receive about a drive shaft 200.

Figure 4:
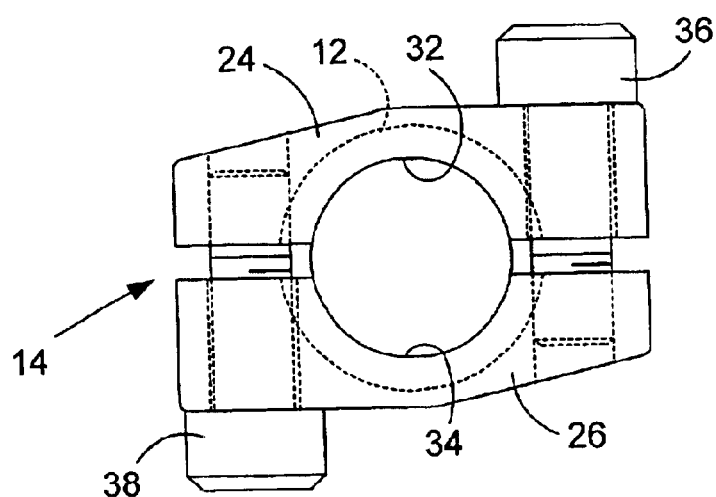
FIG. 4 is a back planar view of the clamp assembly of FIG. 1.

The clamping member 14 preferably includes separate first and second portions 24 and 26 each integrally formed with, and extending from an end portion 18 of the clamping member 14, with each portion 24 and 26 being separated a distance "B" away from each. As can be seen in the drawings, each clamping portion 24 and 26 is preferably formed to be identical to one another, but it is of course to be appreciated that each portion 24 and 26 could be formed to vary from one another in view of required applications. Preferably, a circumferential resilient collar 28 and 30 respectfully connects each clamping portion 24 and 26 to a hub member 12. With reference to FIG. 4, each first and second clamping portion 24 and 26 of clamping member 14 is respectfully formed with a circumferential inner bore portion 32 and 34, each being co-linear with the inner bore portion 20 of hub member 12. Preferably, the clamping member 14 includes a first and second set screw 36 and 38 each receiving within, and passing through each first and second clamping portion 24 and 26. Thus, the tightening of each set screw 36 and 38 effects the movement of the first and second clamping portion 24 and 26 towards one another, via the flexing of the circumferential resilient collars 28 and 30, hence reducing distance "B" and enabling clamping device 10 to fixedly secure about a shaft 200, as further discussed below.

Figure 5:
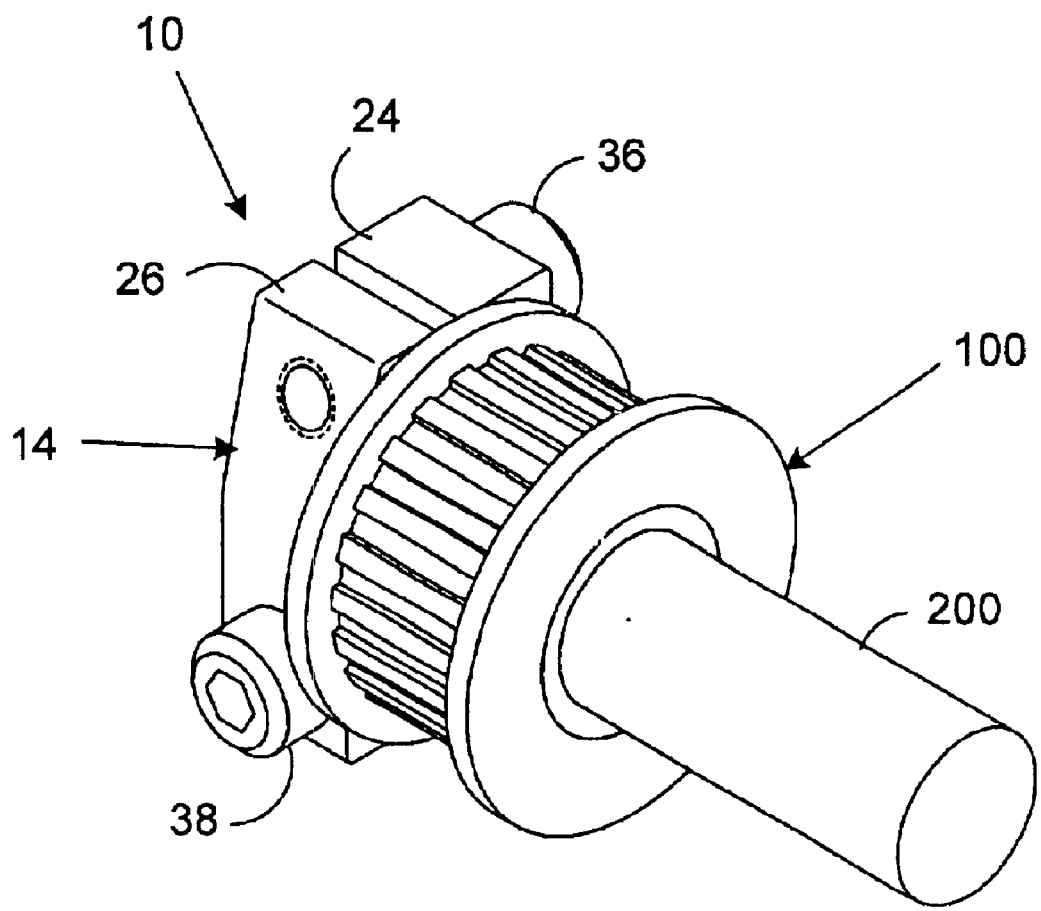
FIG. 5 is an isometric view of the clamp assembly of FIG. 1 assembled with a drive component for mounting on a drive shaft.

Referring now to FIG. 5, with the hub member 12 inserted into the inner bore of pulley 100, the present invention clamping device 10 is shown secured about shaft 200, via the tightening of set screws 36 and 38. In the preferred embodiment of the present invention, pulley 100 is secured to knurled outer surface 22 of hub member 12 by interference or pressed fit. It has been found that the pressed fit between hub member 12 and pulley 100 provides a more reliable fastening than the use of set screws which are known to become loose when subjected to repeated stop and go operation. It will be understood that alternate methods of coupling pulley 100 to hub member 12 can also be use. For example, for components made of softer material, such as urethane, an epoxy can be added during the pressed fit to strengthen the bond between the two materials.

Any commercially available drive component can be used in conjunction with the present invention. A hole is bored into the drive component at a diameter slightly smaller than the outer diameter of the knurled outer surface 22 of hub member 12.

It will be understood by those skilled in the art that the present invention clamping device 10 is suitable for any mechanical drive component which is driven by a drive shaft. For example, clamping device 10 can be used to secure gears, sprockets or cams.

It has been found that the present invention provides an easy and reliable method of securing commercially available drive components, such as pulley 100, to drive shafts without having to mar the shaft by drilling into the shaft or tightening a set screw against the shaft. The present invention has been found to be particularly suitable for use in machines where the mechanical drive components are repeatedly subjected to fluctuations in load caused, for example, by continuous stop and go or deceleration and acceleration movement, such as the clutch and brake operation in an inserter machine. It has also been found that the present invention provides the added advantage of facilitating adjustments to the lateral positioning of the component on the drive shaft.

It will be appreciated by those skilled in the art that the terms "drive shaft" and "drive component", as used herein to describe the present invention, includes driven shafts and driven components.

It will further be appreciated that there has been provided in accordance with the present invention a device for securely locking mechanical drive components to a drive shaft that fully satisfies the objects, aims and advantages set forth above. While this invention has been described in conjunction with specific embodiments thereof, many alternatives, modifications and variations will be apparent to those skilled in the art. Accordingly, it is intended to embrace all such alternatives, modifications and variations that follow within the spirit and scope of the appended claims.

What is claimed is:

1. A clamping device for securing a mechanical component to a drive shaft, comprising:
   a clamping member having separated first and second portions, each being configured to fixedly secure about the drive shaft;
   an elongate cylindrical hub member having a continuous outer circumference configured to secure to the mechanical component and an inner bore configured to receive about the drive shaft; and
   a resilient collar member disposed intermediate the clamping member and elongate hub member wherein one end of the collar member is connected to the first and second portions of the clamping member and an opposing end of the collar member is connected to an end portion of the elongate hub member.

2. The device as recited in claim 1, wherein the clamping member includes at least one set screw for causing the first and second portions of the clamping member to be drawn together and fixedly secured to the drive shaft.

3. The device as recited in claim 1 wherein the resilient collar is configured to flex upon the drawing of the first and second portions of the clamping collar towards one another.

4. The device as recited in claim 3, wherein the resilient collar has an outer cylindrical circumference.

5. The device as recited in claim 4, wherein the outer cylindrical circumference of the resilient collar is less than the outer cylindrical circumference of the elongate hub member.

6. The device as recited in claim 1 wherein the outer cylindrical circumference of the elongate hub member is provided with a knurled surface for securing the hub member to the mechanical component by interference fit.

7. The device as recited in claim 1, wherein the drive component is a pulley.

8. The device as recited in claim 1, wherein the clamping member, elongate hub member and resilient collar are unitarily formed with each other.

9. The device as recited in claim 8, wherein the clamping member, elongate hub member and resilient collar are formed with high density powder metal.

* * * * *